(12) United States Patent
McCracken

(10) Patent No.: US 7,591,075 B2
(45) Date of Patent: Sep. 22, 2009

(54) SELF-LEVELING MECHANISM

(75) Inventor: Robert E. McCracken, Anderson, SC (US)

(73) Assignee: Techtronic Power Tools Technology Limited (VG)

( * ) Notice: Subject to any disclaimer, the term of this patent is extended or adjusted under 35 U.S.C. 154(b) by 53 days.

(21) Appl. No.: 11/528,742

(22) Filed: Sep. 28, 2006

(65) Prior Publication Data

US 2008/0078091 A1  Apr. 3, 2008

(51) Int. Cl.
G01C 15/00 (2006.01)
(52) U.S. Cl. .............................. 33/291; 33/281; 33/283; 33/286; 33/DIG. 21
(58) Field of Classification Search ............ 33/282, 33/283, 285, 286, 290, 291, 227, 228, DIG. 21, 33/374, 375, 391, 395, 397; 248/278.1; 74/5.22, 5.9
See application file for complete search history.

(56) References Cited

U.S. PATENT DOCUMENTS

| | | | |
|---|---|---|---|
| 1,494,722 A | 5/1924 | Tingstrom et al. |
| 2,498,083 A | 2/1950 | Kennedy et al. |
| 2,544,438 A | 3/1951 | Allegeo |
| 2,571,287 A | 10/1951 | Peters |
| 2,600,857 A | 6/1952 | De La Mater |
| 2,611,189 A | 9/1952 | Bello |
| 2,615,426 A | 10/1952 | Fryer |
| 2,711,030 A | 6/1955 | Drew et al. |
| 2,754,594 A | 7/1956 | Harms et al. |
| 2,859,725 A | 11/1958 | Genasci |
| 2,959,088 A | 11/1960 | Rantsch |
| 2,971,427 A | 2/1961 | Keuffel et al. |
| 2,992,487 A | 7/1961 | Miller |
| 3,233,235 A | 2/1966 | Wright |
| 3,427,724 A | 2/1969 | Tracy |
| 3,462,845 A | 8/1969 | Matthews |
| 3,489,324 A | 1/1970 | Stohl |
| 3,675,886 A | 7/1972 | Kampmier |
| 3,724,953 A | 4/1973 | Johnston, Jr. |
| 3,897,637 A | 8/1975 | Genho |
| 3,936,197 A | 2/1976 | Aldrink et al. |
| 4,063,365 A | 12/1977 | Hopkins et al. |
| 4,084,328 A | 4/1978 | Shai |
| 4,221,483 A | 9/1980 | Rando |
| 4,225,106 A | 9/1980 | Eplan |
| 4,333,242 A | 6/1982 | Genho, Sr. |
| 4,467,527 A | 8/1984 | North et al. |
| 4,703,563 A | 11/1987 | Hoshino et al. |
| 4,716,534 A | 12/1987 | Baucom et al. |

(Continued)

FOREIGN PATENT DOCUMENTS

EP  0 977 007 A1  2/2000

(Continued)

*Primary Examiner*—Amy Cohen Johnson
(74) *Attorney, Agent, or Firm*—Michael Best & Friedrich LLP

(57) ABSTRACT

A level, particularly a laser level is provided with a chassis simultaneously pivotable in at least a first direction and a second direction under the influence of gravity and a housing surrounding at least a portion of the chassis. The chassis carries a first light source for emitting a first light beam from the housing along a first plane and a second light for emitting a second light beam from the housing along a second plane.

26 Claims, 8 Drawing Sheets

U.S. PATENT DOCUMENTS

| | | | |
|---|---|---|---|
| 4,852,265 A | 8/1989 | Rando et al. | |
| 4,853,617 A | 8/1989 | Douglas et al. | |
| 4,854,704 A | 8/1989 | Funazaki et al. | |
| 4,907,769 A | 3/1990 | Hunley et al. | |
| 4,912,851 A | 4/1990 | Rando et al. | |
| 4,915,851 A | 4/1990 | Flory | |
| 4,924,597 A | 5/1990 | Tursi | |
| 4,988,192 A | 1/1991 | Knittel | |
| 4,992,741 A | 2/1991 | Douglas et al. | |
| 5,063,679 A | 11/1991 | Schwandt | |
| 5,075,977 A | 12/1991 | Rando | |
| 5,108,177 A | 4/1992 | Middleton | |
| 5,144,487 A | 9/1992 | Hersey | |
| 5,182,863 A | 2/1993 | Rando | |
| 5,218,770 A | 6/1993 | Toga | |
| 5,253,421 A | 10/1993 | Landmark | |
| 5,287,627 A | 2/1994 | Rando | |
| 5,352,974 A | 10/1994 | Heger | |
| 5,366,129 A | 11/1994 | Nakamura et al. | |
| 5,394,616 A | 3/1995 | Claxton | |
| 5,400,514 A | 3/1995 | Imbrie et al. | |
| 5,459,932 A | 10/1995 | Rando et al. | |
| 5,519,942 A | 5/1996 | Webb | |
| 5,524,352 A | 6/1996 | Rando et al. | |
| 5,531,031 A | 7/1996 | Green | |
| 5,541,727 A | 7/1996 | Rando et al. | |
| 5,552,886 A | 9/1996 | Kitajima et al. | |
| 5,584,458 A | 12/1996 | Rando | |
| 5,594,993 A | 1/1997 | Tager et al. | |
| 5,606,802 A | 3/1997 | Ogawa | |
| 5,610,711 A | 3/1997 | Rando | |
| 5,617,202 A | 4/1997 | Rando | |
| 5,617,645 A | 4/1997 | Wick et al. | |
| 5,619,128 A | 4/1997 | Heger | |
| 5,619,802 A | 4/1997 | Rando et al. | |
| 5,621,975 A | 4/1997 | Rando | |
| 5,630,517 A | 5/1997 | Maznik | |
| 5,655,307 A | 8/1997 | Ogawa et al. | |
| 5,713,135 A | 2/1998 | Acopulos | |
| 5,724,744 A | 3/1998 | Bozzo | |
| 5,742,387 A | 4/1998 | Ammann | |
| 5,748,306 A | 5/1998 | Louis | |
| 5,773,721 A | 6/1998 | Bashyam | |
| 5,795,001 A | 8/1998 | Burke | |
| 5,819,424 A | 10/1998 | Ohtomo et al. | |
| 5,829,152 A | 11/1998 | Potter et al. | |
| 5,842,282 A | 12/1998 | Ting | |
| 5,859,693 A | 1/1999 | Dunne et al. | |
| 5,864,956 A | 2/1999 | Dong | |
| 5,872,657 A | 2/1999 | Rando | |
| 5,894,675 A | 4/1999 | Cericola | |
| 5,900,931 A | 5/1999 | Rando | |
| 5,905,455 A | 5/1999 | Heger et al. | |
| 5,917,314 A | 6/1999 | Heger et al. | |
| 5,917,587 A | 6/1999 | Rando | |
| D412,674 S | 8/1999 | Kaiser | |
| D412,857 S | 8/1999 | Howard et al. | |
| 5,949,529 A | 9/1999 | Dunne et al. | |
| 5,956,861 A | 9/1999 | Barnes | |
| D415,436 S | 10/1999 | Martone | |
| 5,999,346 A | 12/1999 | Grundstrom et al. | |
| 6,005,719 A | 12/1999 | Rando | |
| D418,432 S | 1/2000 | Krantz | |
| D418,434 S | 1/2000 | Krantz | |
| D418,763 S | 1/2000 | Krantz | |
| D419,149 S | 1/2000 | Krantz et al. | |
| D419,544 S | 1/2000 | Krantz | |
| D419,545 S | 1/2000 | Krantz et al. | |
| D419,546 S | 1/2000 | Krantz et al. | |
| 6,009,630 A | 1/2000 | Rando | |
| 6,012,229 A | 1/2000 | Shiao | |
| D420,972 S | 2/2000 | Brecher et al. | |
| 6,023,159 A | 2/2000 | Heger | |
| 6,030,091 A | 2/2000 | Li | |
| 6,037,356 A | 3/2000 | Lu et al. | |
| 6,037,874 A | 3/2000 | Heironimus | |
| 6,065,217 A | 5/2000 | Dong | |
| 6,067,152 A | 5/2000 | Rando | |
| D427,166 S | 6/2000 | Krantz | |
| 6,073,353 A | 6/2000 | Ohtomo et al. | |
| 6,137,564 A | 10/2000 | Schmidt et al. | |
| 6,157,591 A | 12/2000 | Krantz | |
| 6,163,969 A | 12/2000 | Jan et al. | |
| 6,178,655 B1 | 1/2001 | Potter et al. | |
| 6,198,271 B1 | 3/2001 | Heger et al. | |
| 6,202,312 B1 | 3/2001 | Rando | |
| 6,209,219 B1 | 4/2001 | Wakefield et al. | |
| 6,211,662 B1 | 4/2001 | Bijawat et al. | |
| 6,215,293 B1 | 4/2001 | Yim | |
| 6,219,931 B1 | 4/2001 | Roth | |
| 6,223,446 B1 | 5/2001 | Potter | |
| 6,249,113 B1 | 6/2001 | Krantz et al. | |
| 6,259,241 B1 | 7/2001 | Krantz | |
| 6,262,801 B1 | 7/2001 | Shibuya et al. | |
| 6,301,997 B1 | 10/2001 | Welte | |
| 6,313,912 B1 | 11/2001 | Piske et al. | |
| 6,351,890 B1 | 3/2002 | Williams | |
| 6,360,446 B1 | 3/2002 | Bijawat et al. | |
| D455,430 S | 4/2002 | Krantz | |
| D455,750 S | 4/2002 | Krantz | |
| 6,382,574 B1 | 5/2002 | Pando | |
| 6,384,420 B1 * | 5/2002 | Doriguzzi Bozzo | 250/548 |
| D461,135 S | 8/2002 | Watson et al. | |
| 6,427,347 B1 | 8/2002 | Butler, Sr. | |
| D464,578 S | 10/2002 | Zurwelle | |
| 6,493,952 B1 | 12/2002 | Kousek et al. | |
| D469,556 S | 1/2003 | Malard et al. | |
| 6,502,319 B1 | 1/2003 | Goodrich et al. | |
| D470,423 S | 2/2003 | Loudenslager et al. | |
| 6,532,675 B2 | 3/2003 | Letourneau | |
| 6,532,676 B2 | 3/2003 | Cunningham | |
| 6,536,122 B2 | 3/2003 | Tamamura | |
| D474,985 S | 5/2003 | Cooper et al. | |
| 6,568,094 B2 * | 5/2003 | Wu | 33/281 |
| D475,938 S | 6/2003 | Lopano | |
| 6,577,388 B2 | 6/2003 | Kallabis | |
| 6,581,296 B2 | 6/2003 | Ponce | |
| D476,584 S | 7/2003 | Zurwelle | |
| 6,593,754 B1 | 7/2003 | Steber et al. | |
| 6,594,910 B2 | 7/2003 | Wishart | |
| 6,606,798 B2 | 8/2003 | El-Katcha et al. | |
| 6,612,714 B1 | 9/2003 | Morre et al. | |
| 6,625,895 B2 | 9/2003 | Tacklind et al. | |
| 6,640,456 B2 | 11/2003 | Owoc et al. | |
| 6,674,276 B2 | 1/2004 | Morgan et al. | |
| 6,718,643 B2 | 4/2004 | Tamamura | |
| 6,754,969 B2 | 6/2004 | Waibel | |
| 6,763,595 B1 | 7/2004 | Hersey | |
| 6,763,596 B1 | 7/2004 | Puri et al. | |
| 6,829,834 B1 | 12/2004 | Krantz | |
| 6,880,256 B2 | 4/2005 | Helms | |
| 6,964,106 B2 * | 11/2005 | Sergyeyenko et al. | 33/286 |
| 6,964,545 B1 | 11/2005 | Languasco | |
| 6,968,627 B1 | 11/2005 | McAllester | |
| 7,167,500 B2 * | 1/2007 | Kallabis | 372/107 |
| 2001/0007420 A1 | 7/2001 | Bijawat et al. | |
| 2001/0029675 A1 | 10/2001 | Webb | |
| 2001/0034944 A1 | 11/2001 | Cunningham | |
| 2001/0049879 A1 | 12/2001 | Moore | |
| 2001/0053313 A1 | 12/2001 | Luebke | |
| 2002/0017028 A1 | 2/2002 | Wishart | |
| 2002/0059735 A1 | 5/2002 | Ponce | |
| 2002/0069543 A1 | 6/2002 | Owoc et al. | |
| 2002/0073561 A1 | 6/2002 | Liao | |

| | | | | | |
|---|---|---|---|---|---|
| 2002/0152621 A1 | 10/2002 | Letourneau | 2005/0198845 A1 | 9/2005 | Robinson |
| 2002/0162233 A1 | 11/2002 | El-Katcha et al. | 2005/0206891 A1 | 9/2005 | Khubani |
| 2002/0166249 A1 | 11/2002 | Liao | 2006/0016083 A1 | 1/2006 | Huang |
| 2002/0178596 A1 | 12/2002 | Malard et al. | 2006/0037203 A1 | 2/2006 | Long et al. |
| 2002/0193964 A1 | 12/2002 | Hsu | | | |
| 2003/0061720 A1 | 4/2003 | Waibel | | | |
| 2003/0101605 A1 | 6/2003 | Tacklind et al. | | | |
| 2003/0131491 A1 | 7/2003 | Weeks | | | |
| 2003/0201783 A1 | 10/2003 | Steber et al. | | | |
| 2003/0218469 A1 | 11/2003 | Brazell et al. | | | |
| 2003/0231303 A1 | 12/2003 | Raskin et al. | | | |
| 2004/0000918 A1 | 1/2004 | Sanoner et al. | | | |
| 2004/0004825 A1 | 1/2004 | Malard et al. | | | |
| 2004/0031163 A1 | 2/2004 | El-Katcha et al. | | | |
| 2004/0205972 A2 | 10/2004 | Wu | | | |
| 2005/0022399 A1 | 2/2005 | Wheeler et al. | | | |
| 2005/0066533 A1 | 3/2005 | Wheeler et al. | | | |
| 2005/0155238 A1 | 7/2005 | Levine et al. | | | |

FOREIGN PATENT DOCUMENTS

| | | |
|---|---|---|
| EP | 0 981 037 A1 | 2/2000 |
| EP | 1 235 051 A3 | 8/2003 |
| EP | 1 357 353 A3 | 10/2003 |
| EP | 1 367 364 A3 | 12/2003 |
| EP | 1 367 365 A3 | 12/2003 |
| EP | 1 367 366 A3 | 12/2003 |
| EP | 1 376 054 A1 | 2/2004 |
| GB | 2 383 138 A | 6/2003 |
| GB | 2 389 194 A | 12/2003 |
| GB | 2 390 498 A | 1/2004 |

\* cited by examiner

SELF-LEVELING MECHANISM

This invention relates to a self-leveling mechanism. The self-leveling mechanism can be used for a variety of tasks. In one aspect, the self-leveling mechanism can be used for a light level.

BACKGROUND

Self-leveling mechanisms are known. For example, a variety of pendulum-type devices are currently being marketed light leveling. Many of these devices, however, are self-leveling in only a single direction. An example of such a device is shown in U.S. Pat. No. 7,031,367, which shows a housing with a pendulum pivotably connected to the housing. A first laser diode is disposed on the pendulum for emitting a first laser beam along a first path and a second laser diode disposed on the pendulum for emitting a second laser beam along a second patent that is substantially perpendicular and non-intersecting with respect to the first laser beam.

U.S. Pat. No. 5,539,990 shows an optical leveling, plumbing, and angle-calibrating device that uses a plumb body that has a ball received in a socket that is connected to a frame to provide a pendulous mount. Light sources are mounted above the ball to project a variety of lines, two of which are intersecting. While self-leveling mechanisms are useful for light leveling, it is also desirable to provide a mechanism for self-leveling for other uses.

Therefore, it is an object of the present invention to provide a self-leveling mechanism that is easy to use.

BRIEF SUMMARY

The present invention, therefore, provides an improved self-leveling mechanism. The self-leveling mechanism includes a chassis that is simultaneously pivotable in at least a first direction and a second direction under the influence of gravity. The mechanism also includes a stationary bearing that has an inner race that is rotatable with respect to an outer portion of the stationary bearing. The mechanism also includes an inner bearing that operates transversly to the stationary bearing. The chassis is operatively connected to the inner bearing and to the inner race of the stationary bearing to allow the chassis to pivot at least in a first direction and desirably in at least a first and second direction where the first and second directions are different.

The chassis may further include a bracket having a first end and a second end to define a longitudinal axis, with each end connected to a respective arm. A shaft is transversely mounted on the bracket and carries the inner bearing. An inner bearing holder has a first portion fixed to the inner bearing and a second portion fixed to the inner race of the stationary bearing. The chassis may further have or include one or more sections or housings to carry an apparatus such as a light source.

One aspect of the present invention is directed to a light level device incorporating the self-leveling mechanism of the present invention. The device includes a self-leveling mechanism with a chassis that is simultaneously pivotable in at least a first direction and a second direction under the influence of gravity. A housing may optionally surround at least a portion of the chassis. A first light source provided on the chassis for emitting a first light beam from the housing along a first plane; and a second light source provided on the chassis for emitting a second light beam from the housing along a second plane.

Additional features and benefits of the present invention are described and will be apparent from the accompanying drawings and detailed description below.

BRIEF DESCRIPTION OF THE DRAWINGS

The accompanying drawings illustrate embodiments of the invention according to the practical application of the principles described and shown.

DESCRIPTION

Figure 5:
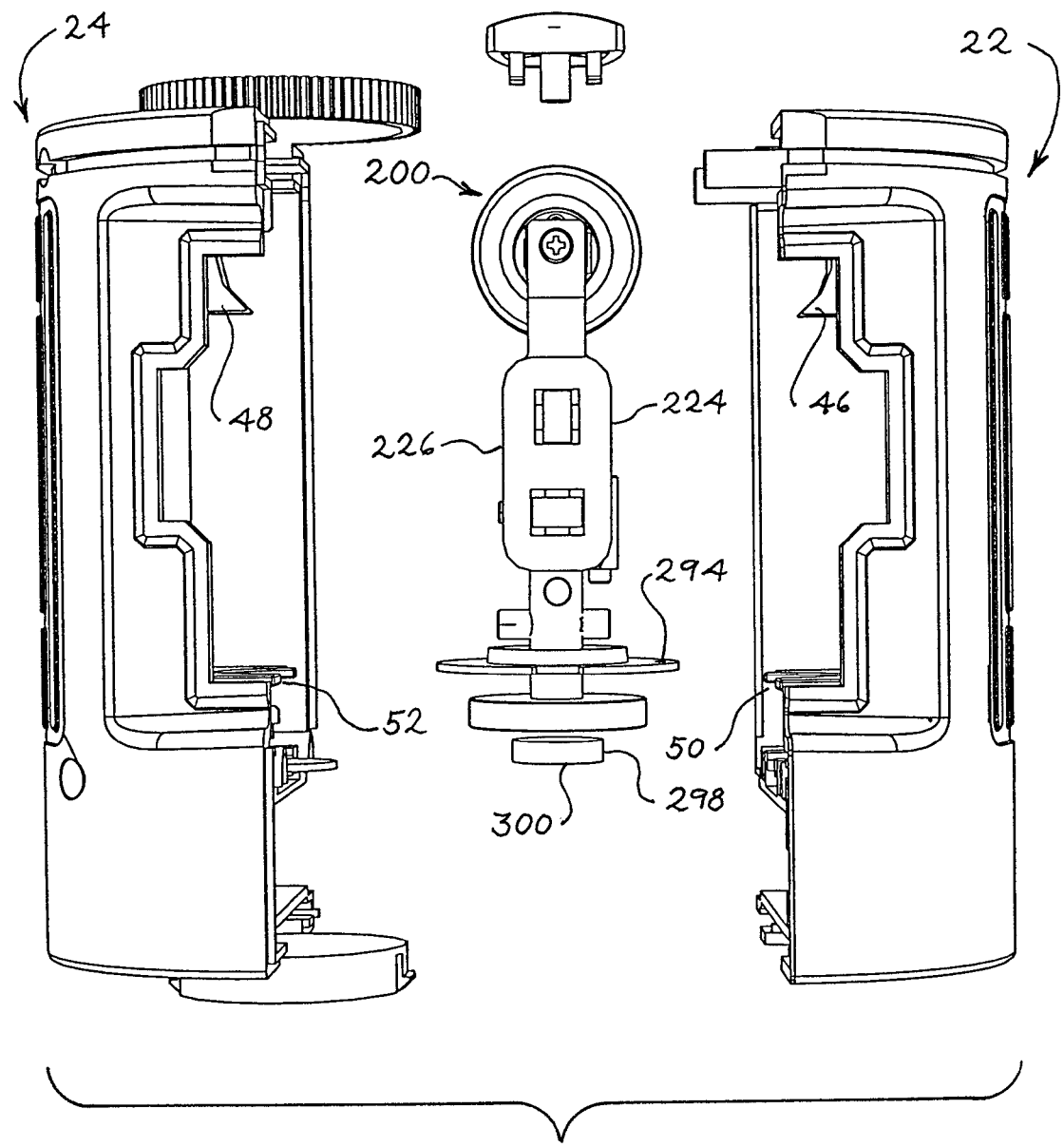
FIG. 5 is a front view with the housing portions separated to better show one embodiment of a self-leveling mechanism according to the present invention.
Figure 6:
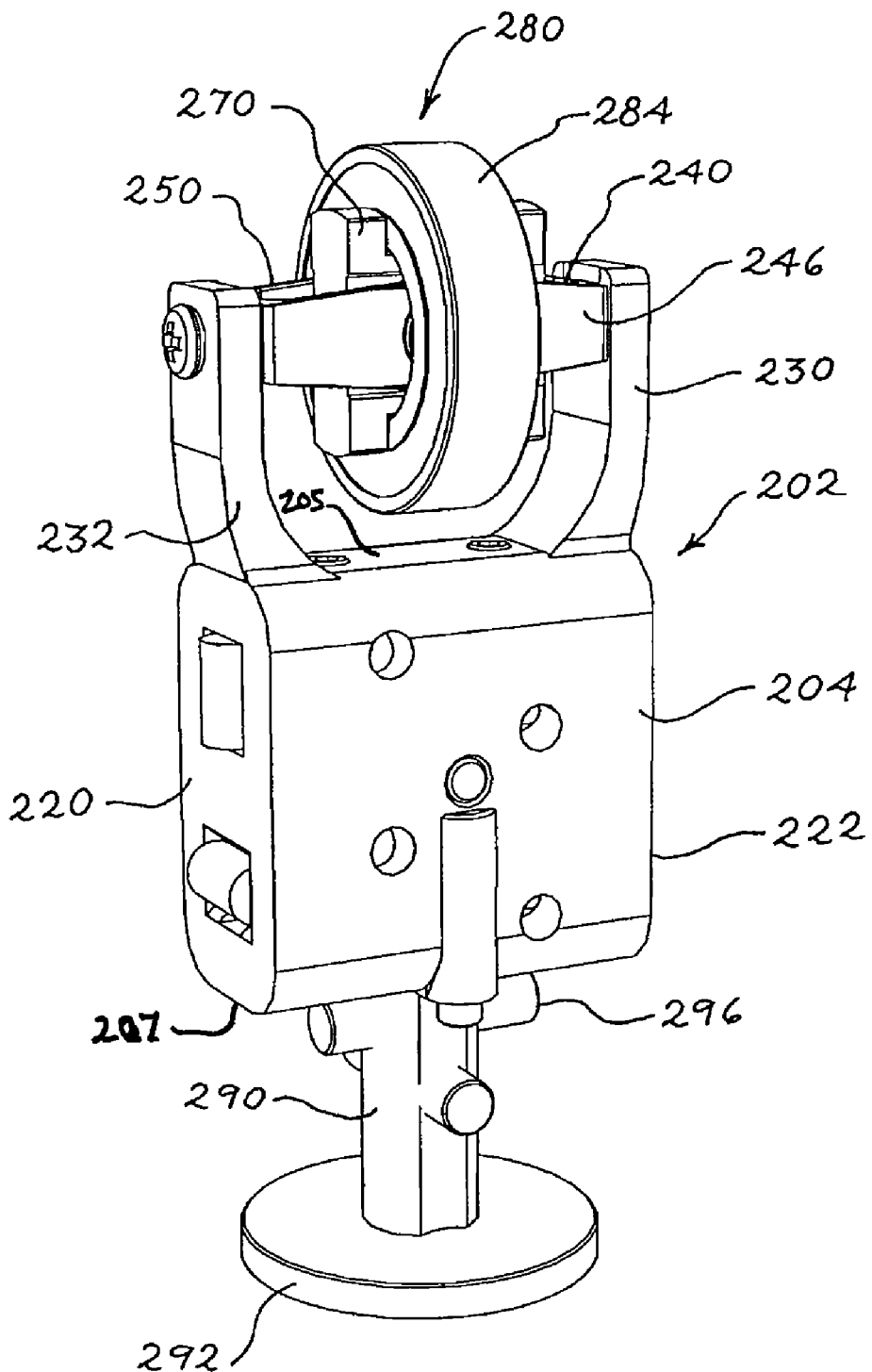
FIG. 6 is a perspective view of the self-leveling mechanism according to one embodiment of the present invention.
Figure 7:
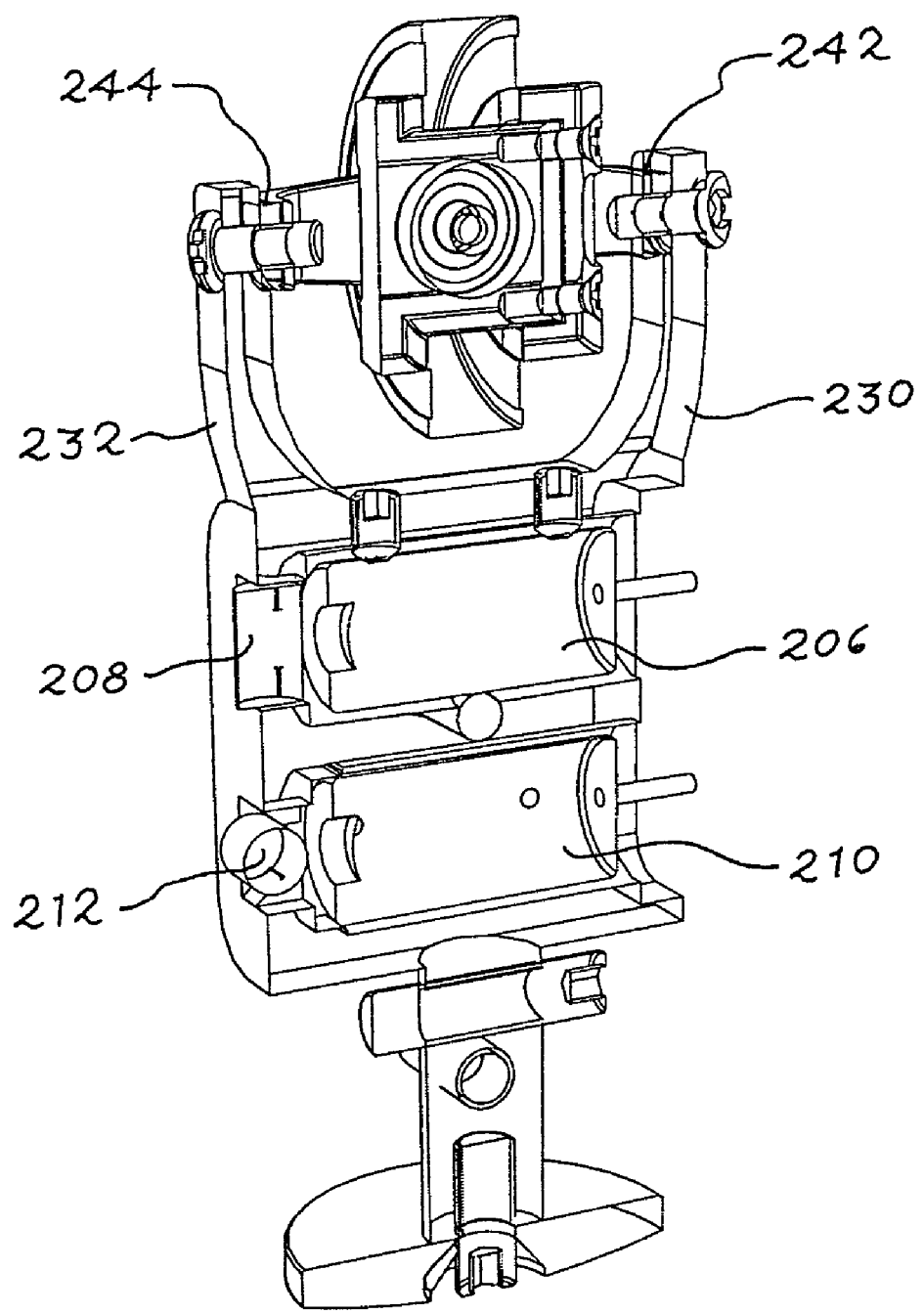
FIG. 7 is a cross sectional view of the self-leveling mechanism of FIG. 6.
Figure 8:
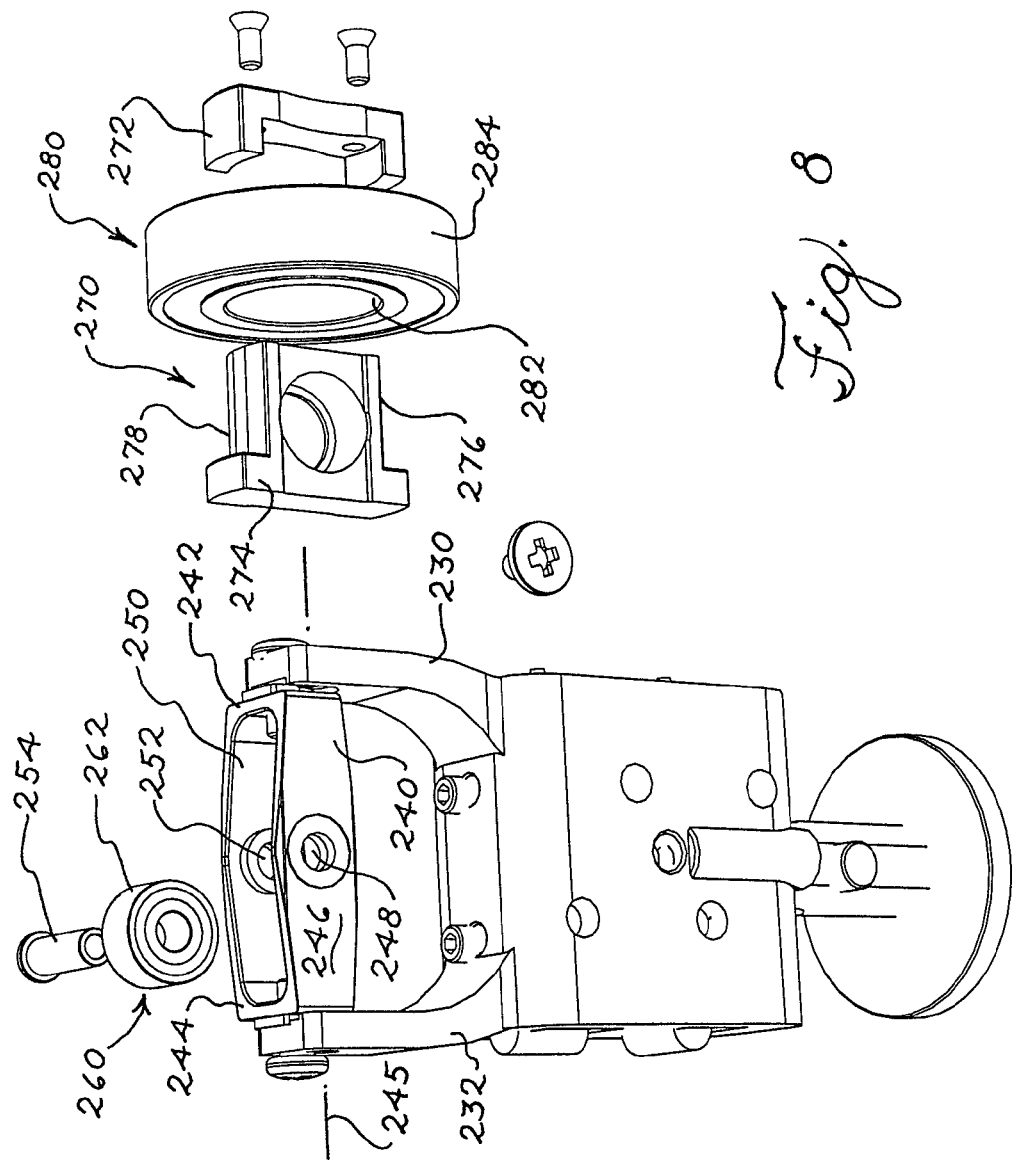
FIG. 8 is a partially exploded view of the mechanism of FIG. 6.

Referring to FIGS. 5-7, one embodiment of a self-leveling mechanism 200 according to the present invention is shown. Details of the self-leveling mechanism will be explained below in the context of its use as a light level. It is to be understood, however, that the self-leveling mechanism of the present invention can be used to accomplish a variety of tasks and can be used with a variety of apparatus other than a light source. Therefore, the following description of the self-leveling mechanism in connection with its use as a light level should not be considered to limit the scope of the self-leveling mechanism of the present invention. Rather, the description of the light level should merely be considered to be an exemplary use of the self-leveling mechanism of the present invention.

With that in mind, a light level device 10 incorporating the self-leveling mechanism 200 of the present invention generally includes a chassis 202 that is pivotable to provide a "true" horizontally and/or vertically aligned projected light beam and at least two light sources for projecting the light beams.

The light level 10 may project a plurality of lines that may be intersecting, non-intersecting, or may have some of the lines be intersecting and others non-intersecting. In one aspect, the level 10 projects three non-intersecting lines. In another aspect, the level 10 projects a pair of lines that are orthogonal to each other.

The level 10 includes a self-leveling laser line mechanism 200 for projecting at least two lines, each orthogonal to the other. The lines desirably intersect to from a cross hair. In one aspect, the projected lines are movable with respect to a mounting surface so that the projected lines can be moved to a desired location. In this aspect, the projected lines can be selectively moved in a horizontal or vertical direction. In another aspect, the projected lines can be selectively rotated with respect to a mounting surface.

Figure 1:
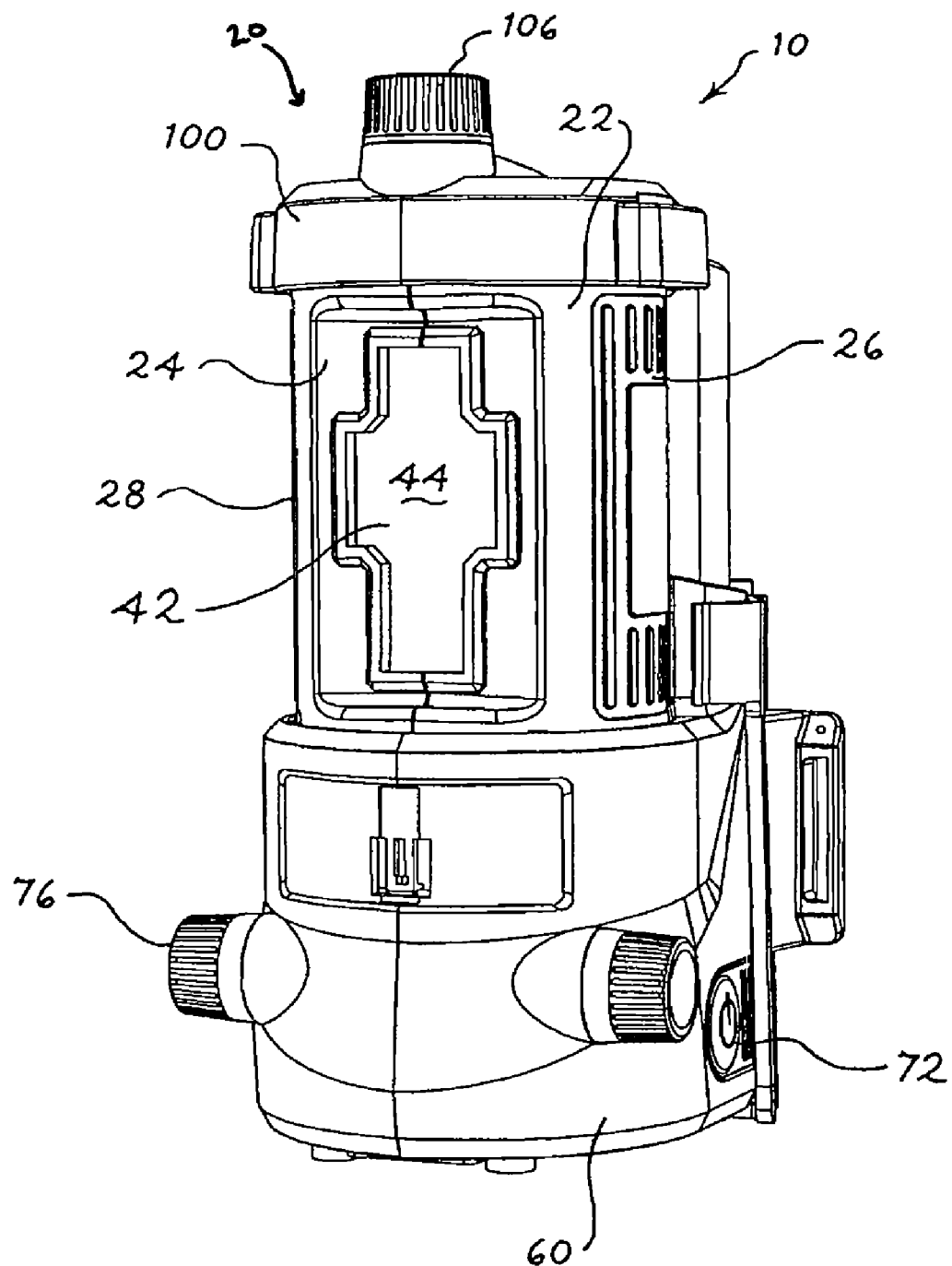
FIG. 1 is a front perspective view of a self-leveling mechanism according to one embodiment of the present invention where the self-leveling mechanism operates to provide a light level and the self-leveling mechanism is provided within a housing.

Turning now to FIG. 1, the housing 20 for a light level 10 incorporating a self-leveling mechanism 200 of the present invention is shown. The housing 20 typically is formed from two pieces, a first piece 22 and a second piece 24. The first piece 22 complements and engages the second piece 24 to surround at least a portion of the chassis 202. When assembled, the housing 20 has a first side 26, a second side 28, a front 30, a rear 32, a top 34 and a bottom 38. The top 34 and bottom 38 generally define a longitudinal axis 40. An opening 42 is provided on the front 30 of the housing to provide an egress for the projected light beams. A transparent or translucent shield 44 may be provided within the opening 42 to allow the projected beams to pass through the opening yet protect the light projecting device and other structures within the housing 20.

Figure 4:
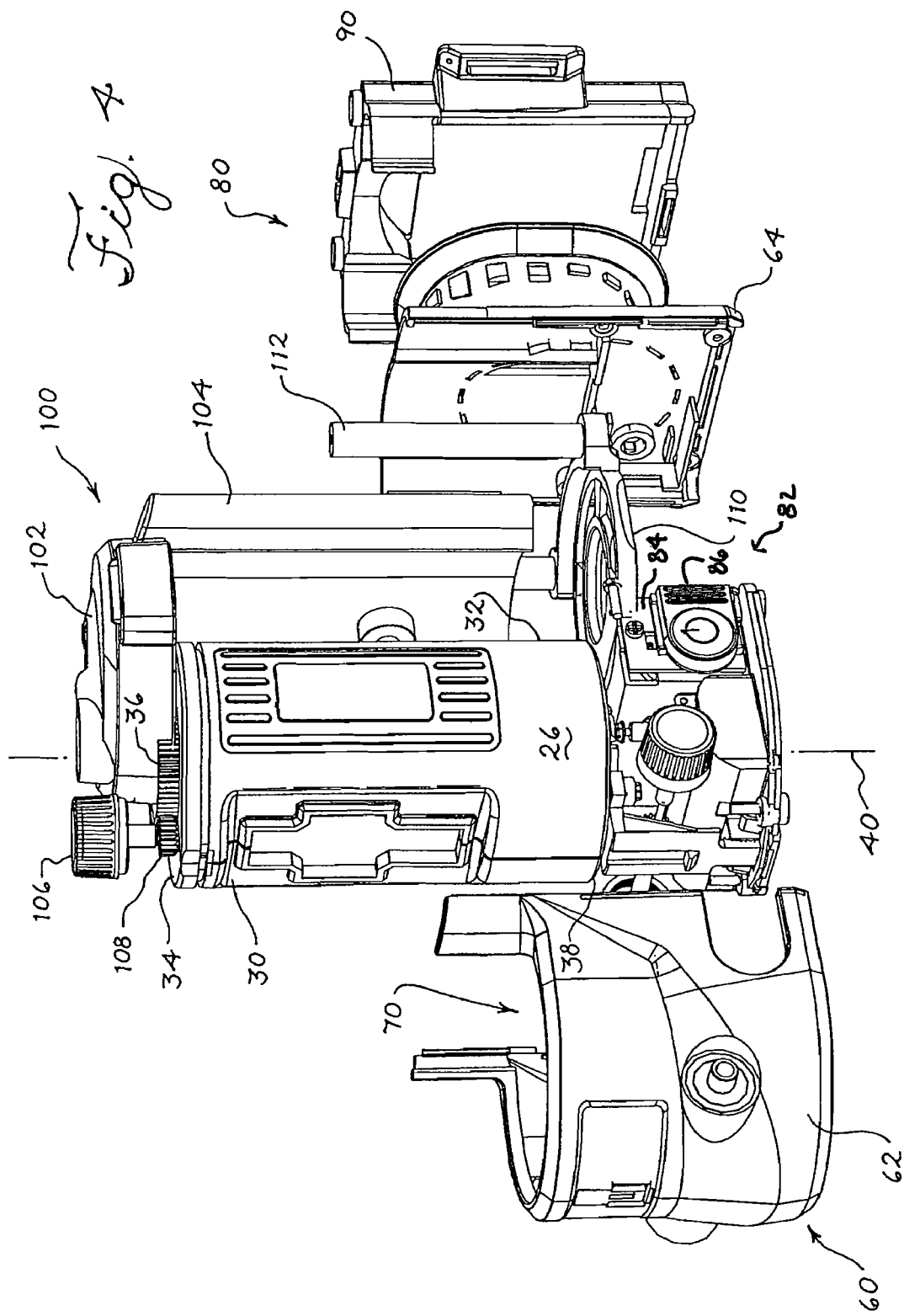
FIG. 4 a perspective view of the housing partially exploded to better show certain features of the invention.

The housing 20 may be provided with structure or may be associated with structure that allows the housing 20 to be mounted to a surface such as a wall, a floor, a ceiling, a beam. As best seen in FIG. 4, the housing 20 is associated with a base 60 that is provided adjacent the bottom 38 of the housing. The base 60 includes a first section 62 that partially surrounds the housing 20 and a second section 64 that cooperates with the first section 62 to define a cavity 70. The first section 62 is generally adjacent the front 30 of the housing 20 and the second section 64 is generally adjacent the rear 32 of the housing 20.

Figure 2:
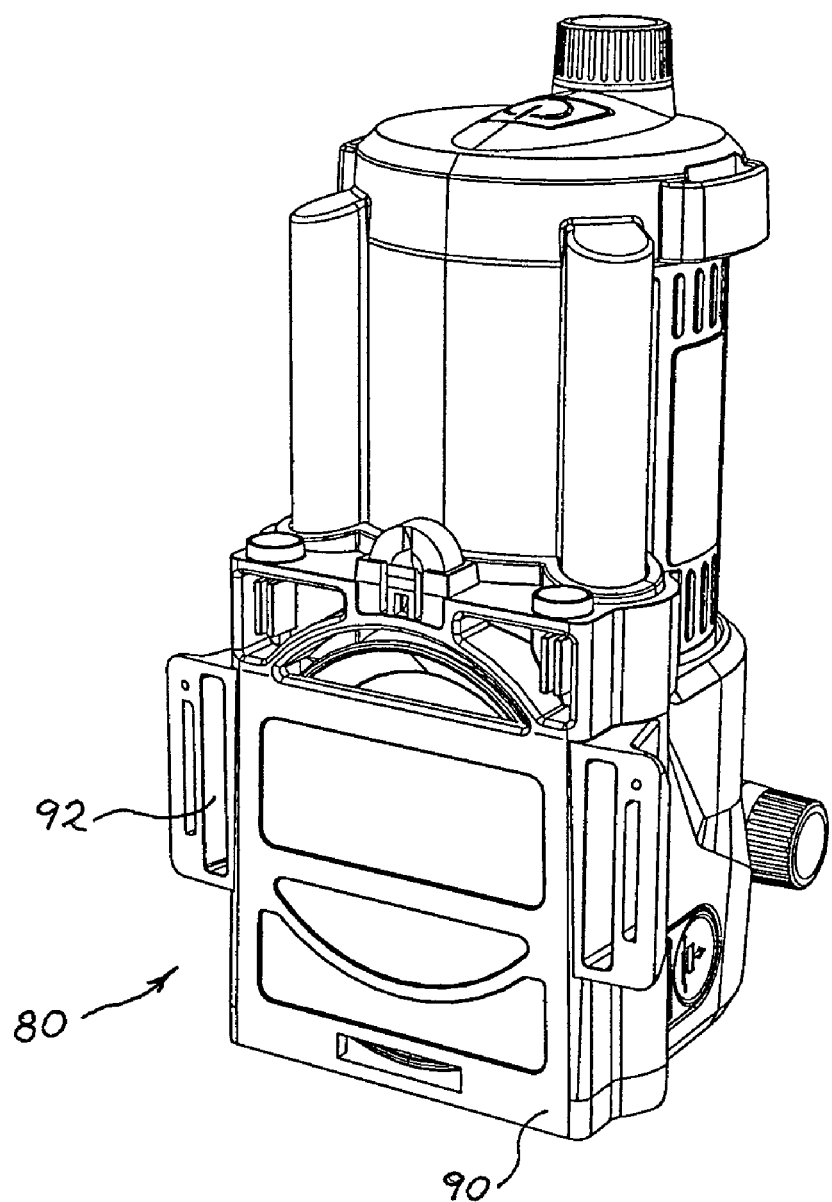
FIG. 2 is a rear perspective view of the housing of FIG. 1.
Figure 3:
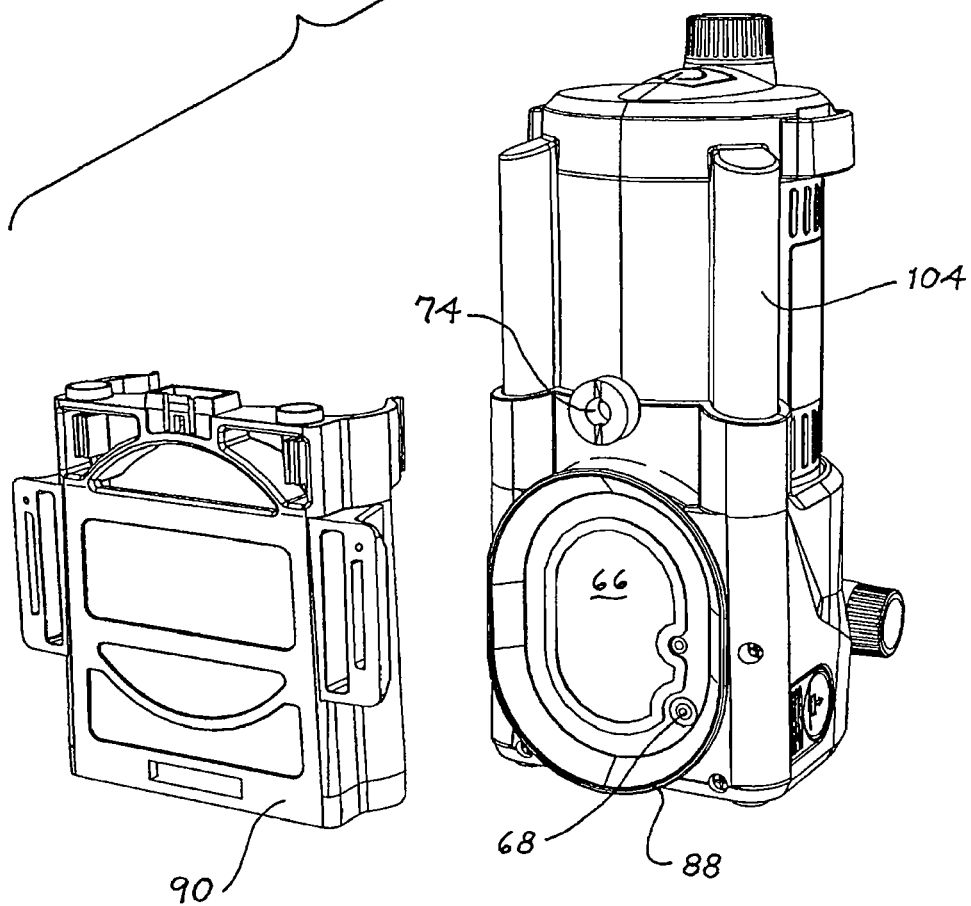
FIG. 3 is a rear perspective of the housing of FIG. 1 with a mounting structure removed from the housing.

In one aspect of the present invention, the level 10 is provided with a mounting assembly 80. Referring to FIGS. 2 and 3, various aspects of a mounting assembly 80 are shown and FIG. 3 shows an exploded view of a cover 90 that cooperates with the second section 64 of the base.

In one aspect, the mounting assembly 80 includes a vacuum generating mechanism 82 disposed within the cavity 70 defined by the first 62 and second 64 sections of the base 60. The vacuum generating mechanism 82 cooperates with a mounting seal 88 provided on a rear portion 66 of the second section 64 of the base 60. In one embodiment, the vacuum generating mechanism 82 includes a motor 84 and a vacuum pump 86 operatively connected to the motor 84. It is understood that the motor 84 and the pump 86 may be formed as a single unit. A hose connects an inlet on the pump 86 to an aperture 68 in the rear portion 66 of the base 60. Air is drawn through the aperture by the pump 86.

A power source disposed within the cavity 70 is electrically connected to the motor 84. The power source may include a rechargeable battery pack, such as a lithium ion or nickel cadmium battery, or a removable rechargeable or alkaline battery. The motor 84 and the pump 86 of the vacuum generating mechanism 82 cooperate with the mounting seal 88 to create a vacuum pocket or suction mounting area between the mounting surface, the mounting seal, and the rear portion of the base. The mounting 88 seal is desirably a rubber suction cup that cooperates with the mounting surface to define a vacuum pocket.

A switch 72 extends from the base 60, for example from the first section 62 of the base, and is operatively connected to the pump 86 to allow a user to activate the pump 86 to remove air from the vacuum pocket. Another switch may be provided to turn off the pump or to reverse the pump to assist in reducing the vacuum within the vacuum pocket to ease removal of the assembly from the mounting surface. For example, the cover 90 may actuate a switch when the cover 90 is placed on the rear portion 66 of the second section 64 of the base to turn off the pump 86 or motor 84. In use, after the user places the mounting 88 seal in contact with a mounting surface, the user actuates the switch 72, which activates the pump 86. The pump 86 evacuates air from the vacuum pocket through the inlet to assist in maintaining a releasable mounting connection between the mounting assembly 80 and the mounting surface. It is to be understood that the vacuum generating mechanism 80 can be a manual suction mounting arrangement.

In one aspect, a sensor disposed within the cavity 70 may monitor the vacuum pressure in the vacuum pocket. The sensor may activate the pump 86 to remove air from the vacuum pocket if the sensor detects a loss or reduction of pressure in the vacuum pocket. Loss of vacuum pressure may be caused by imperfections in the mounting surface or the mounting seal 88 such as gaps or cracks that limit the effectiveness of the mounting seal. The sensor allows the pump 86 to compensate for the surface flaws to ensure an appropriate seal to the mounting surface.

The mounting assembly 80 may also include an aperture 74 provided on the cover 90, on the rear portion 66 of the base 60, or on another desirable location that will allow the level 10 to be mounted. The aperture 74 is sized to receive a nail, screw, or other projecting structure so that the level 10 can be mounted on such. The aperture 74 may be used in conjunction with or separate from the mounting seal 88. As shown in FIGS. 2 and 3, the mounting assembly 80 may also include a cover 90 that is removable from the second section 64 of the base. The cover 90 has a size and shape such that when it is attached to the base 60, the cover 90 will protect the mounting seal 88. The cover 90 may be provided with apertures 92 to receive mounting straps (not shown) to allow the level 10 to be mounted to a surface such as a beam with the straps. Alternatively or additionally, the cover 90 may be provided with magnetic material to allow the cover 90 and thus the level 10 to be attached to suitable surfaces.

The housing 20 is rotatable with respect to the base 60. Accordingly, when the base 60 is mounted such that the second section 64 of the base is adjacent a surface to which the light level 10 is mounted, the housing 20 can rotate with respect to the base 60. In one aspect, the housing 20 can rotate about an arc of at least about 180 degrees to about 240 degrees. As a result, if the laser level 10 is mounted on a substantially vertical wall, the housing 20 can be rotated such that the projected beam of light can be moved from one position to another where the other is opposite the one.

The housing 20 is also movable in a longitudinal direction (i.e., along the axis 40) such that the top 34 of the housing can be moved closer to or farther away from the base 60. In this regard, as best seen in FIG. 4, a top lift 100 has a cap 102 that surrounds at least a portion of the top 34 of the housing. The cap 102 cooperates with the top 34 of the housing such that when the top lift 100 is moved in a direction away from the base 60, the top of the housing 34 will likewise be moved away the base 60. The top lift 100 has a pair of channels 104 each of which receives posts 112 extending from a bottom lift 110 such that when the bottom lift 100 is moved along the longitudinal axis 40, the top lift 100 and thus the housing 20 will also be moved along the longitudinal axis 40.

The base 60 has at least one knob 76, and as shown in the figures, two knobs extending from the base 60. The knobs 76 are associated with a rack and pinion type device (not shown), which is connected to the bottom lift 110 so that when the knobs 76 are rotated, the bottom lift 110 will move along the longitudinal axis 40 causing the top lift 100 and thus the housing 20 to move along the longitudinal axis 40. Accordingly, as the knobs 76 are rotated in one direction, the bottom lift 110 moves toward or away from the base 60, causing the top lift 100 to move toward or away from the base 60 thus causing the housing 20 to move toward or away from the base 60.

As noted above, the housing 20 is rotatable with respect to the base 60. The housing 20 is also rotatable with respect to the top 100 and bottom lift 110. A rotation actuation knob 106 extends from the cap 102 of the top lift 100 to provide an easily accessible actuator to rotate the housing 20. The knob 106 is connected at its lower end to a gear 108, which in turn is meshed with a gear 36 provided on the top 34 of the housing. As a result, as the knob 106 is rotated, the housing 20 rotates with respect to the top lift 100. The cap 102 and/or the knob 106 may be provided with visual indicators to provide a visual indication of the angular rotation of the housing 20.

Turning now to FIGS. 5-7, the self-leveling mechanism 200 of the present invention is shown. The mechanism 200 includes a chassis 202 that is restrained from movement other than pivoting movement to allow the chassis 202 to self-level. In other words, the housing 20 and the chassis 202 cooperate to maintain the chassis 202 in a fixed longitudinal and horizontal location yet allow the chassis 202 can pivot in at least two directions to allow the chassis 202 to self-level. This self-leveling aspect of the chassis 202 allows the projected light beams to project a "true" horizontal or vertical beam.

The chassis 202 includes a chassis housing 204 for carrying a first light source 206 and a second light source 210. It is understood that the chassis housing could carry only a single light source. Alternatively, the chassis housing 204 could carry more than two light sources. The chassis housing 204 has a top 205, a bottom 207, a front side 220, a rear side 222, and a first 224 and second side 226. The front side 220 is adjacent the front side 30 of the housing. In a desired embodiment and as noted above, the first light source 206 will project a first light beam through the opening 42 in the housing 20 along a first plane and the second light source 210 will project a second light beam through the opening 42 in the housing 20 along a second plane. The light source is typically a laser diode that projects a laser light through a lens to create a projected beam. As shown in FIGS. 5-7, the first lens 208 and the second lens 212 are oriented orthogonally with respect to each other. In this configuration, the first light beam will be in a direction different from the second light beam (i.e., the first light beam is perpendicular to the second light beam).

The laser diodes 206, 210 may be powered from an electrical source that may be the same as or different from the power source used for the vacuum generating mechanism 82, if provided. In one embodiment, the laser diodes 206, 210 are powered from a source that can be actuated at the same time the motor 84 or pump 86 for the vacuum generating mechanism 82 is actuated. In another embodiment, a separate switch is provided so that the laser diodes 206, 210 can be powered while the vacuum generating mechanism 82 is not operating. In this instance, a switch may be provided on the cap of the top lift.

Two spaced apart arms 230, 232 extend from the top of the chassis housing 204. The first arm 230 extends from the chassis housing 204 adjacent the front side 220 and the second arm 232 extends from the chassis housing 204 adjacent the rear side 222. Each arm is connected to a bracket 240 that has a first end 242 and a second end 244 spaced from the first end and defining a longitudinal axis 245. The bracket 240 has two spaced apart walls 246, 250 connecting the first 242 and second ends 244. Each wall 246, 250 has an aperture 248, 252 such that the aperture 248 in the first wall is aligned with the aperture 252 in the second wall. The apertures 248, 252 receive a shaft 254 that is fixed to the walls 246, 250, desirably non-rotatably fixed to the walls 246, 250. The shaft 254 carries an inner bearing 260 that can rotate about the shaft 254. The outer annular surface 262 of the inner bearing 260 is fixedly mounted in an inner bearing holder 270 that is located between the walls 246, 250 of the bracket 240.

The inner bearing holder 270 may be formed from two pieces to simplify construction. The inner bearing holder 270 may have an outer peripheral shape in the form of an H with the side walls 276, 278 spaced from first 272 and second 274 walls. The first and second walls 272, 274 of the inner bearing holder 270 are fixed to an inner race 282 of an outer bearing 280. The outer bearing 280 has an annular surface 284 that is fixed or stationary so that the inner race 282 can rotate or pivot with respect to the fixed annular surface 284 of the outer bearing 280 along the longitudinal axis of the bracket 245. The annular surface 284 of the outer bearing 280 may be held stationary by the first 26 and second 28 side of the housing 20. For example, the first side 26 can have a first arm 46 that contacts and surrounds a portion of the annular surface 284 of the outer bearing 280 and the second side 28 can have a second arm 48 that contacts and surrounds another portion of the annular surface 284 of the outer bearing 280 so that when the first side 26 and the second side 28 of the housing 20 are assembled the annular surface 284 of the outer bearing 280 is fixed in position with respect to the housing 20.

In addition, because the outer bearing 280 is fixed and the inner bearing 260 can rotate with respect to the inner bearing holder 270, the chassis 202 can pivot in a direction perpendicular to the longitudinal axis 245 of the bracket. As a result, the chassis 202 can simultaneously pivot in at least two directions (which will effectively allow the chassis 202 to pivot in any number of directions to self-level the chassis).

Extending from the bottom of the chassis 202 is a counterweight 292. The counterweight 292 may be provided on a distal end of a shaft 290 to provide a lower center of gravity and may improve the performance of the self-leveling aspect. The counterweight 292 may have at least one adjustment screw 294 to adjust the center of gravity. In addition, the shaft may have one or more adjustment 296 screws to adjust the center of gravity as necessary. The counterweight 292 may be located within a space defined by two spaced apart flanges 50, 52 provided on the first and second pieces of the housing 22, 24. The flanges 50, 52 are spaced apart a distance to allow the chassis 202 to pivot contact between the counterweight 292 and the surfaces of the flanges will act to slow the pivoting or reduce the degree of pivoting the chassis can experience.

In addition, a damping mechanism 298 may be provided at the bottom of the chassis 202 to assist the self-leveling mechanism 200. In this regard, a magnetic material, ferrous material, or non-ferrous conductive material such as zinc or copper may be provided on a portion of the bottom of the chassis 202 opposite and aligned with at least one magnet 300 for providing a damping action on the chassis 202. Basically, Eddie currents are generated as the chassis 202 moves and interacts with the magnetic field supplied by the magnet(s) 300.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The invention claimed is:
1. A self-leveling light level device comprising:
a chassis simultaneously pivotable in at least a first direction and a second direction under the influence of gravity;
a housing surrounding at least a portion of the chassis;
a stationary bearing operatively connected to the chassis and having an outer portion fixed to the housing and an inner race rotatable with respect to an outer portion of the stationary bearing;
a first light source provided on the chassis for emitting a first light beam from the housing along a first plane;

a second light source provided on the chassis for emitting a second light beam from the housing along a second plane; wherein the first light beam and the second beam are emitted from the housing in the same direction;

a bracket having a first end and a second end to define a longitudinal axis and with each end connected to a respective arm; and a shaft transversely mounted on the bracket and carrying an inner bearing, wherein the bracket includes a first wall spaced from a second wall, with each wall having an aperture to receive a part of the shaft carrying the inner bearing.

2. The invention of claim 1 wherein the first plane and the second plane are in different directions.

3. The invention of claim 1 wherein the first plane and the second plane are substantially orthogonal.

4. The invention of claim 1 wherein the chassis has a pair of arms operatively connected to the inner race of the stationary bearing.

5. The invention of claim 4 wherein the chassis includes a chassis housing for carrying each of the first light source and second light source.

6. The invention of claim 1 wherein the inner bearing is operatively connected to the chassis and operates transverse to the stationary bearing.

7. The invention of claim 1 further comprising
an inner bearing holder having a first portion fixed to the inner bearing and a second portion fixed to the inner race of the stationary bearing.

8. The invention of claim 1 wherein the housing is a clamshell housing including a first and a second half that when assembled define a front of the device.

9. The invention of claim 8 wherein the housing has a spaced apart top and bottom defining a longitudinal axis.

10. The invention of claim 9 further comprising a base associated with the housing.

11. The invention of claim 10 wherein the housing is rotatable with respect to the base.

12. The invention of claim 10 wherein the housing is rotatable about the longitudinal axis.

13. The invention of claim 10 wherein the housing is movable with respect to the base along the longitudinal axis.

14. The invention of claim 10 further comprising a mounting assembly.

15. The invention of claim 14 wherein the mounting assembly includes a vacuum mounting arrangement.

16. The invention of claim 8 further comprising a mounting assembly.

17. The invention of claim 16 wherein the mounting assembly includes a vacuum mounting arrangement.

18. A self-leveling light level device comprising
a chassis with a top, a bottom, and a pair of spaced apart arms extending from the top of the chassis;
a bracket extending between the arms;
a cylindrical inner bearing mounted to the bracket and having an axis orthogonal to the bracket to allow the chassis to rotate with respect to the inner bearing in a direction orthogonal to the axis of the bearing; the inner bearing having an outer annular surface fixedly mounted in an inner bearing holder;

an outer cylindrical bearing having an axis orthogonal to the axis of the inner cylindrical bearing, the outer bearing having an inner race rotatably fixed to the inner bearing holder and being rotatable with respect to a stationary outer annular surface such that the chassis is simultaneously pivotable in at least a first direction and a second direction under the influence of gravity; and, a first light source provided on the chassis for emitting a first light beam along a first plane,
wherein the bracket includes a first wall spaced from a second wall, with each wall having an aperture to receive a part of a shaft carrying the inner bearing.

19. The invention of claim 18 further comprising a second light source provided on the chassis for emitting a second light beam along a second plane.

20. The invention of claim 19 wherein the first light beam and the second beam are emitted in the same direction.

21. The invention of claim 18 wherein the inner bearing holder is disposed between the first and second wall of the bracket.

22. The invention of claim 21 wherein the inner bearing holder has an H-shape.

23. The invention of claim 19 wherein the first plane and the second plane are in different directions.

24. The invention of claim 19 wherein the first plane and the second plane are substantially orthogonal.

25. The invention of claim 18 further comprising:
a counterweight extending from the bottom of the chassis and an adjustment screw disposed between the counterweight and the bottom of chassis, the adjustment screw being rotatable to adjust a center of gravity of the chassis.

26. A self-leveling mechanism comprising:
a chassis with a top, a bottom, and a pair of spaced apart arms extending from the top of the chassis;
a bracket extending between the arms;
a cylindrical inner bearing mounted to the bracket and having an axis orthogonal to the bracket to allow the chassis to rotate with respect to the inner bearing in a direction orthogonal to the axis of the bearing; the inner bearing having an outer annular surface fixedly mounted in an inner bearing holder; and, an outer cylindrical bearing having an axis orthogonal to the axis of the inner cylindrical bearing, the outer bearing having an inner race rotatably fixed to the inner bearing holder and being rotatable with respect to a stationary outer annular surface such that the chassis is simultaneously pivotable in at least a first direction and a second direction under the influence of gravity, wherein the bracket includes a first wall spaced from a second wall, with each wall having an aperture to receive a part of a shaft carrying the inner bearing and wherein the inner bearing holder is disposed between the first and second wall of the bracket.

* * * * *